(12) United States Patent
Rothschild et al.

(10) Patent No.: US 11,025,528 B1
(45) Date of Patent: Jun. 1, 2021

(54) DYNAMIC VIRTUAL NETWORK FUNCTION PLACEMENT FOR OPTIMAL BORDER GATEWAY PROTOCOL SUPPORT

(71) Applicant: Cox Communications, Inc., Atlanta, GA (US)

(72) Inventors: Keith Alan Rothschild, Dunwoody, GA (US); Dipan Patel, Atlanta, GA (US); Ron Lev, Atlanta, GA (US); Steve Malenfant, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 7 days.

(21) Appl. No.: 16/453,382

(22) Filed: Jun. 26, 2019

Related U.S. Application Data

(60) Provisional application No. 62/716,130, filed on Aug. 8, 2018.

(51) Int. Cl.
| | |
|---|---|
| *H04L 12/00* | (2006.01) |
| *H04L 12/721* | (2013.01) |
| *H04L 12/66* | (2006.01) |
| *H04L 12/733* | (2013.01) |

(Continued)

(52) U.S. Cl.
CPC .......... *H04L 45/14* (2013.01); *G06F 9/45558* (2013.01); *H04L 12/66* (2013.01); *H04L 45/122* (2013.01); *H04L 45/586* (2013.01); *G06F 2009/45595* (2013.01)

(58) Field of Classification Search
CPC ..... H04L 45/04; H04L 45/302; H04L 45/306; H04L 47/13; H04L 2209/56; H04L 29/12339; H04L 41/00; H04L 41/06; H04L 41/0809; H04L 41/0816; H04L 41/0846; H04L 41/0869; H04L 41/0876; H04L 41/0879; H04L 41/0886; H04L 41/18; H04L 41/20; H04L 43/028; H04L 43/12;

(Continued)

(56) References Cited

U.S. PATENT DOCUMENTS

| | | | | |
|---|---|---|---|---|
| 7,143,151 | B1 * | 11/2006 | Kayashima | H04L 41/0806 709/223 |
| 7,447,151 | B2 * | 11/2008 | McDysan | H04L 67/16 370/231 |

(Continued)

*Primary Examiner* — Phuc H Tran
(74) *Attorney, Agent, or Firm* — Merchant & Gould P.C.

(57) ABSTRACT

Optimization of network-performant-sensitive Internet data traffic for improved performance of network-performant-sensitive applications is provided. A system and method identify an optimal route for data from a client-network to a remote host-network and direct the data along the optimal route. In one implementation, a VNF is configured as a default gateway for the data and is deployed at a strategic location along the optimal route, thus forcing the data on the route. In another implementation, a VNF is deployed on a network and configured as a virtual router. A client network that is provisioned for optimized routing services communicates with the virtual router, wherein the virtual router advertises the optimized route to peers to route the targeted subset of traffic on the optimal route. In another implementation, the system is configured to emulate a router and advertise the optimized route to peers to route the data on the optimal route.

20 Claims, 8 Drawing Sheets

(51) Int. Cl.
*G06F 9/455* (2018.01)
*H04L 12/713* (2013.01)

(58) Field of Classification Search
CPC ......... H04L 51/00; H04L 51/10; H04L 51/12; H04L 61/2503; H04L 63/0209
See application file for complete search history.

(56) References Cited

U.S. PATENT DOCUMENTS

2014/0101331 A1    4/2014  Bartlett
2018/0256975 A1*  9/2018  Perlman ............... H04N 19/169

* cited by examiner

DYNAMIC VIRTUAL NETWORK FUNCTION PLACEMENT FOR OPTIMAL BORDER GATEWAY PROTOCOL SUPPORT

CROSS REFERENCE TO RELATED APPLICATION

This application claims the benefit of U.S. Provisional Application No. 62/716,130, having the title of "Dynamic Virtual Network Function Placement for Optimal Border Gateway Protocol Support" and the filing date of Aug. 8, 2018, which is incorporated herein by reference in its entirety.

BACKGROUND

In a computer network, latency is the amount of time it takes for a packet of data to get from one designated point to another. Latency can depend on various factors, such as the speed of the transmission medium, an overloaded server device, an overloaded client device, malware, as well as delays in the transmission by devices along the way (e.g., routers and modems). According to some examples, increased latency or lag can be attributed to non-optimal network routes. For example, a large portion of Internet traffic traverses long-haul backbone links due to content routing. In some instances, a service provider may utilize specific routing protocols and routing algorithms to select a preferred route that involves offloading traffic from the service provider's network onto another network, such as a long-haul carrier network, as quickly as possible. This is sometimes referred to as "hot-potato routing." While this may help to ensure that the service provider connections are not abused as long-haul carriers, these preferred routes may not be optimal. According to one example, offloading traffic onto long-haul carrier networks in this manner may cause a "trombone effect" or "tromboning," where data packets may travel a sub-optimal latency-causing path (e.g., that can resemble the bent pipes of a trombone) that can produce a negative impact on latency and, correspondingly, a negative impact on application performance and the user experience.

According to another example, when traffic is offloaded onto a long-haul carrier network from a service provider's network(s), the service provider may not have as much control over certain data quality functions as the service provider would be able to deliver within its own infrastructure. A sub-optimal path may be associated with increased latency, jitter, lag, and/or increased drop-outs, which can be detrimental to certain online activities. While this may be acceptable for some online activities, it may not be acceptable for online activities sensitive to network performance.

For example, in online activities where real-time (i.e., nearly instantaneous) response is expected (e.g., online gaming, online (musical) jam sessions, critical infrastructure applications, online video conferencing), a certain amount of latency (also referred to herein as lag) between a client and a server can be detrimental to the experience (e.g., in gaming: delay between player input, and response of the game, game stuttering, and low frame rates; in online video conferencing: video frame freezing, screen-share failure, delays, and choppy audio, in online jam sessions: non-synchronized audio). While computer networks possess some inherent amount of latency, latency is not constant. The amount of latency can vary and can suddenly increase for various reasons, resulting in "jitter." These unexpected time delays can be perceived as lag. In various examples, jitter or lag can render an online activity (e.g., latency-sensitive or network performant-sensitive online activities) unusable.

While a smooth online experience is desirable for most online activities, a tolerance or acceptability for lag can depend on specific types of online activities. For example, if additional lag from an increase in the latency of an Internet connection becomes noticeable when surfing the Web or running an online application, the tolerance for lag may be higher. That is, while the lag may be noticed and may not be desirable, it is likely not catastrophic to the online experience. Alternatively, during an online gaming activity such as an online racing game or a first-person shooter genre game experience that may be faster paced or where timing may be important factor, the tolerance for lag may be low. That is, dropped packets, jitter, or lag can disrupt normal gameplay. Further, certain online activities, such as online gaming, are typically used for longer sessions (e.g., an hour, several hours) where any perceived jitter or lag during the session may be detrimental to the user experience. Accordingly, a technical solution is needed to solve the technical problem of network traffic routing that may be subject to increased latency, jitter, lag, and/or increased drop-outs, which can be detrimental to certain online activities.

SUMMARY

Aspects of the present disclosure provide a technical improvement to the routing of network performant-sensitive Internet data for enabling network connections that are less subject to increased latency, drop outs, jitter, or other aspects that may lead to negative application performance and a negative user experience. A system, method, and computer readable storage device are provided that optimize network performance (e.g., low latency, low packet loss; low number of hops) for applications sensitive to network performance by identifying an optimal network path and directing network performant-sensitive data traffic along the identified optimal network path. Accordingly, dropped packets, jitter, or lag that can disrupt an application or that can cause an application to be difficult or impossible to perform successfully can be minimized, thus improving performance of the application and improving the user experience.

According to one implementation example, a virtual network function (VNF) configured as a gateway is deployed at a strategic location in a network, wherein the VNF is operative or configured to alter the behavior for a targeted subset of traffic. For example, an optimal route for the targeted subset of traffic can be identified, and based on the identified route, a VNF is deployed at a determined optimal location and configured as the default gateway for the targeted subset of traffic to steer the traffic along the optimal route. According to an aspect, utilization of VNFs enables increased flexibility and can reduce implementation times to near-real-time. This allows for the steering of network traffic in ways that previously would have required more complex solutions. An example of a more complex solution involves an identification and tagging of packets, and then a placement of the tagged packets into a special network flow that directs the packets to a specified location. This example includes the use of exhaustive tools such as deep-packet inspection, which not only needs to be implemented early enough in the network steering process so the packets can be captured and redirected before leaving a particular network, but must also be configured to occur in parallel to normal network transmissions, so as to avoid impacting the behavior of other network traffic.

According to another implementation, a VNF is deployed on a service provider network that is configured as a virtual router. A client network that is provisioned for optimized routing services is configured to communicate with the virtual router, wherein the virtual router advertises the optimized route to peer routers to route the targeted subset of traffic on the optimal route.

According to another implementation, instead of deploying a VNF, an optimized route server is configured to emulate a router and advertise the identified optimized route to peer routers to route the targeted subset of traffic on the optimal route.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure enable a technical improvement to routing of network performant-sensitive data that improves performance of network performant-sensitive applications. A system, method, and computer readable storage device are provided that optimize performance for network performant-sensitive data by identifying an optimal network path for the network performant-sensitive data and directing the network performant-sensitive data traffic along the identified optimal network path.

Figure 1:
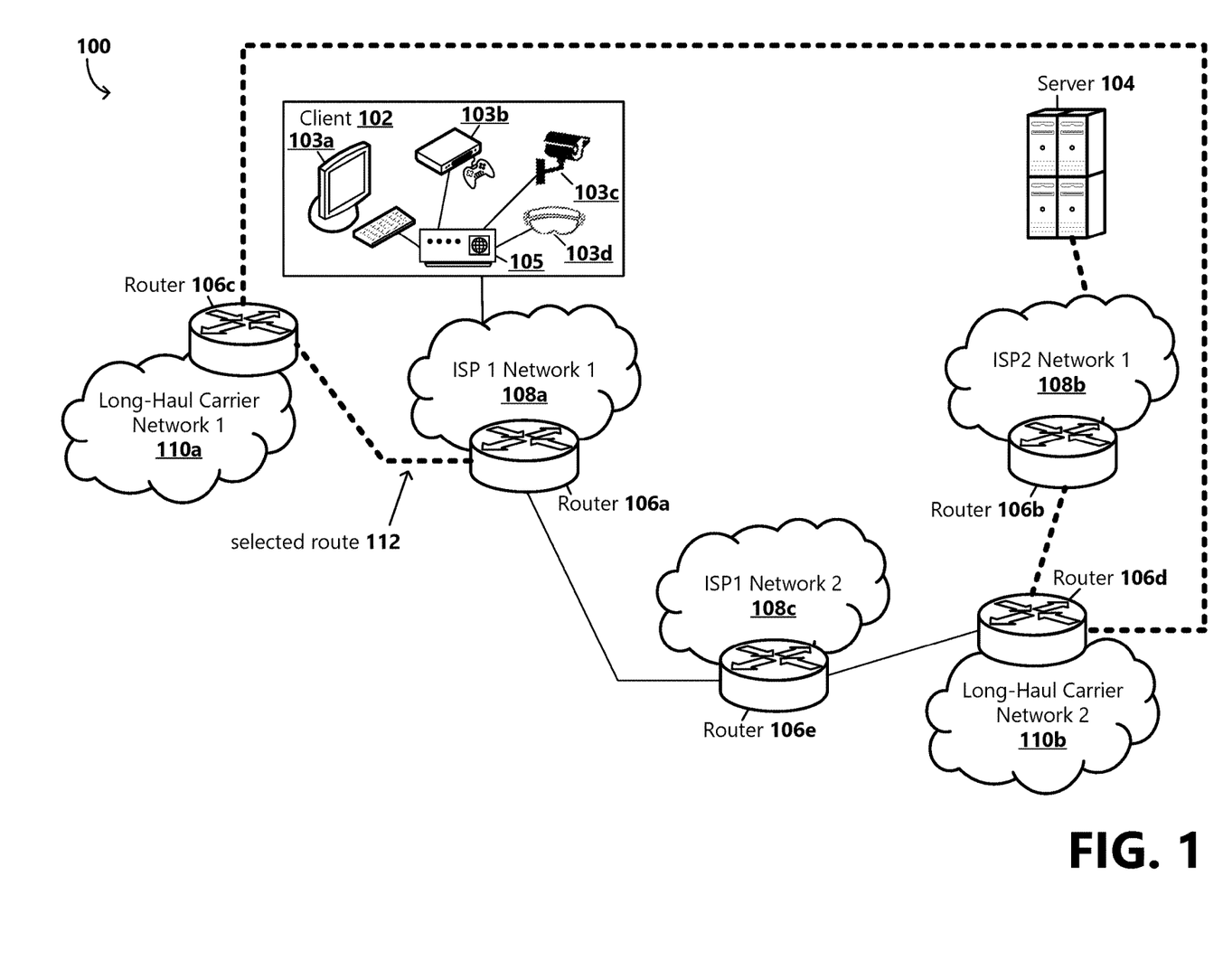
FIG. 1 is a block diagram of an example environment in which aspects of the present disclosure are not implemented.

FIG. 1 is a block diagram of an example operating environment 100 of a prior solution implementation that does not employ a VNF and in which slower network performance may occur, which can cause poor application performance/a negative online experience. As shown in FIG. 1, a client network 102 is in communication with a host/remote server 104 via a network or a combination of networks 108a-n/110a-n (e.g., the Internet, an intranet, an extranet, local-area networks, wide-area networks, fiber-coax networks, public switched telephone networks, global telephone networks, wired networks, wireless networks, and combinations thereof). The remote server 104 can be implemented as a single computing device or as a plurality of computing devices cooperating in a distributed environment, and is configured to provide information and services to various clients (e.g., host a network performant-sensitive service/application).

According to examples, the client network 102 includes at least one client device 103a-n (generally 103), which operates as an interface between a user or a user environment and the underlying communication network and is configured to request, display, and interact with information obtained from the server 104. Some examples of client devices 103 include various types of computing devices, such as a desktop computer, a tablet device, a mobile phone, a gaming console, a set-top box, a smart device, a dedicated digital media player, a wearable device, a smart device, an IoT device, etc. Details of client computing devices and variations thereof can be found in FIGS. 5, 6A, and 6B. In various examples, a client device 103 also operates as a host and provides information to the remote server 104.

The client network 102 further includes one or more intermediary devices 105 (e.g., a modem, a router, a combined modem and router) configured to connect the client device(s) 103 to other networks and enable customers to access service providers' services and distribute them around their premises via a local area network (LAN). According to various examples, the client 102 can operate as a game client that connects to a game server (server 104) as part of providing an online (multiplayer) video game. The client 102 can perform various functions, such as collecting data (e.g., score, player status, position and player movement) and sending data to the game server 104, which allows the server to collect each individual player's data for providing to other players. The client 102 may also allow information sharing among users (based on user-permissions).

As illustrated, the networks include Internet service provider (ISP) networks 108a,b,c (generally 108) and long-haul carrier networks 110a,b (generally 110). For example, a long-haul carrier may own, operate, and sell access to Internet backbone infrastructure and services, such as to ISPs which, in turn, provide Internet access to customers (e.g., user of client 102). The client 102 accesses a target server 104 through a first ISP network 108a, which is configured to route Internet data to a destination server or to another network along a route to the destination server. As illustrated, each network 108,110 includes at least one router 106a-n (generally 106). In many examples, the networks include a plurality of routers 106 (e.g., internal and external routers). As an example, a router 106 can be embodied as an edge router located at an ISP network boundary, enabling the ISP network 108 to connect to external networks, such as a long-haul carrier network 110. The router 106 may utilize specific routing protocols (e.g., internal gateway protocols, external gateway protocols) and routing algorithms to select a preferred route to the target server 104.

According to the illustrated example, the specific routing protocols and routing algorithms may be configured for "hot-potato" routing, wherein Internet traffic is passed off to another network (e.g., long-haul carrier network 110 or another ISP network) as quickly as possible (e.g., to ensure that the ISP's connections are not abused as long-haul carriers). An example selected route 112 is shown in FIG. 1. For example, the selected route 112 offloads traffic from a first network 108*a* of the ISP (ISP1 Network 1 108*a*) to a long haul carrier network (long-haul carrier network 1 110*a*), rather than routing traffic to another of the ISP's networks (ISP 1 Network 2 108*c*). As described above, sometimes these selected routes 112 may not be optimal (e.g., may not be the shortest path, may increase latency, may drop packets) for certain types of data (network performant-sensitive data), which can negatively impact performance of an application or online activity. For example and as illustrated, the selected route 112 may be a longer path to the target server 104 or may include additional hops (in comparison with other possible routes). In some cases, with network performant-sensitive online activities (online activities associated with a low tolerance for lag, such as online gaming, video conferencing, critical infrastructure applications, healthcare applications) increased lag, jitter, or dropped packets, which can sometimes be a result of "hot-potato routing," can be catastrophic to the online experience.

Figure 2A:
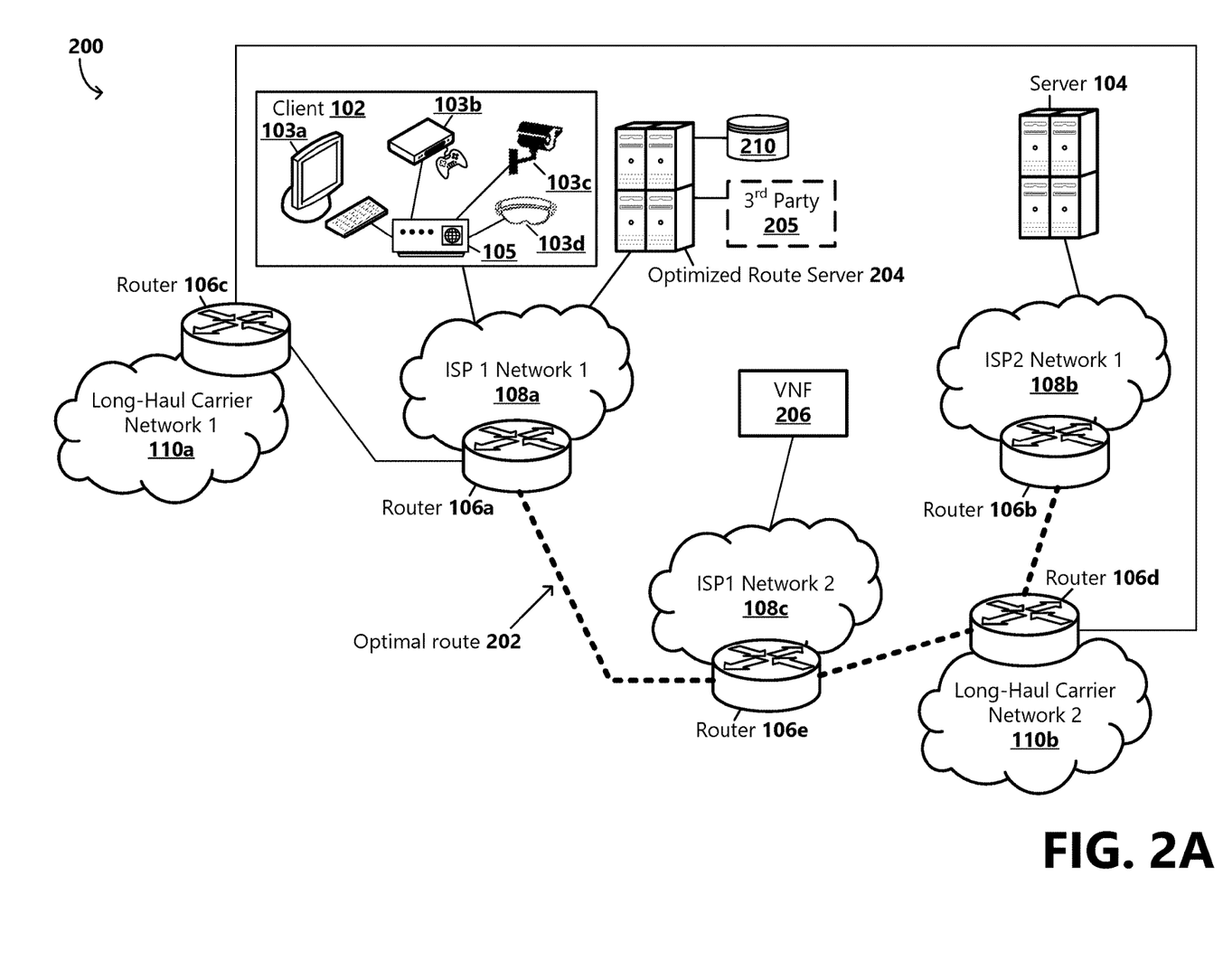
FIG. 2A is a block diagram of an example environment in which a system can be implemented for improving performance of network performant-sensitive online activities according to an embodiment.

FIG. 2A is a block diagram of an example environment 200 in which a system can be implemented for improving performance of network performant-sensitive online applications/activities according to an embodiment. According to an aspect, a router 106*a* at a first ISP network 108*a* is operative or configured to communicate with other (internal and/or external) routers for enabling traffic flow between respective networks (e.g., 110*a*, 108*a*). As is known in the art, border gateway protocol (BGP) is a routing protocol that is designed to exchange routing and reachability information between autonomous systems on the Internet. Two routers (e.g., router 106*a* and 106*c*, 106*a* and 106*e*, 105 and 106*a*) that have established a connection for exchanging BGP information may be referred to as BGP peers. Such BGP peers exchange routing information between them via BGP sessions that run over TCP/IP (Transmission Control Protocol/Internet Protocol), a networking standard that defines rules for data exchange between computers and enables computers to communicate over the Internet as well as private IP networks. Each BGP peer manages a table (BGP routing table) with all the routes it knows for each network and propagates that information to its neighboring autonomous systems. In this way, BGP allows an autonomous system to collect all the routing information from its neighboring autonomous systems and "advertise" that information further (e.g., to other routers, to client router 105). Additionally, each peer transfers the information internally inside its own autonomous system. Typically, a plurality of routes exists to reach a given destination, and BGP is responsible for determining the most suitable route according to the information collected.

According to an aspect, the system includes an optimized route server 204 operative or configured to identify an optimal route 202 for transfer of data from a client network 102 to a destination (e.g., remote server 104). In various implementations, the optimized route server 204 identifies an optimal route 202 for a particular subset of data (e.g., network performant-sensitive data). According to one example, network performant-sensitive data can be identified based on a set of rules, which can be learned and/or configurable. In example aspects, specific instances of data are identifiable by the optimal route server 204 as network performant-sensitive according to a particular identifier (e.g., a target server 104 IP address) that has been associated with the data via an upstream application, such as an application that runs on the client intermediary device 105 that connects the customer to the IP network 108 (e.g. a home gateway) or a network function that is in the service function chain (e.g. VNF-based virtual-router solution).) In some examples, data can be identified as network performant-sensitive based on packet type or based on an identifier associated with the (client) application used to send the data, etc. In some implementations, a user configuration or service provider configuration step may be performed during a setup phase (e.g., when a user subscribes to particular optimal routing services) to configure Internet data or a particular subset of data (e.g., data transferred as part of an online game application session) to be routed to a particular router (e.g., a virtualized router or emulated router) as part of an optimal routing service.

In some examples, the optimized route server 204 is configured to determine an optimal route 202 based on a BGP routing table, known information about the underlying network topology (e.g., underlying network topology of ISP networks 108 and other networks 110), network performance, and the ISP's routing policies. Network topology information can include measurements data taken from various servers located through the ISP network 108, as well as measurements data collected from other servers throughout other networks, including ping data (e.g., between the client 102 and the target server 104, between the client and various servers in various networks), reliability data, physical network structure data, etc. For example, as part of identifying the optimal route 202, the optimized route server 204 is configured to continually send out test packets to determine the behavioral characteristics between various end points on the ISP network 108. As can be appreciated, Internet traffic conditions are ever-changing; accordingly, an optimal route 202 from the client network 102 to the destination server 104 may change frequently. According to an aspect, routes may be monitored continuously for dynamically determining an optimal route 202 for transmitting network performant-sensitive data to the server 104. According to examples, the optimized route server 204 is operative or configured to determine a plurality of optimal routes, for example, an optimal route 202 to each of a plurality of target servers 104, wherein these optimal routes are dynamically changing.

In various examples, the optimized route server 204 may apply one or more optimizing algorithms to collected data for selecting a particular route as an optimal route 202, wherein the particular route may be a route that has not been considered as an optimal route (e.g., according to a BGP routing table) because, as one example, it may be longer than another route (e.g., more hops, longer distance). However, based on known and collected network topology information, the optimized route server 204 is configured to determine that the particular route (202) outperforms other routes, for example, due to the particular route (202) having lower latency, fewer drop outs, less jitter, or other factors that may lead to a negative online experience. This determination can be done manually by a user-defined configuration file, or automatically, either through an analysis of historical data or through the use of data specifically designed to aid the determination. In some examples, a selected optimal route 202 may have one or a combination of physical advantages (e.g., optical fiber), technical advantages (e.g., better performing routers 106), an advantage of being on the ISP network 108, and other advantages.

In various implementations, the optimized route server 204 is configured to determine an optimal route 202 for transferring data to a particular target server 104 based on various factors according to the ISP's routing policies. The ISP's routing policies can be based on various factors (e.g., cost, reliability, speed, web application being used, port(s) used, destination IP address, QOS (Quality of Service) classifications). In some examples, the ISP may have a routing policy that gives preference to a route to a server 104 where the data stays on the ISP's network(s) 108 for as long as possible until it reaches the target server or until it is offloaded to another network (e.g., long-haul carrier network 110, other network), which may enable the ISP to offer a higher quality of service to their customers, thus optimizing a user experience for online activities sensitive to network performance. This practice may sometimes be referred to as "cold-potato routing." In some examples, the ISP may have certain routing policies for certain data types or subscription types. For example, an ISP may have a certain customer base that subscribes to a service with a higher quality of service and thus has certain routing policies to apply to network performant-sensitive data communications, such as game application data traffic between the customer's client network 102 and a particular server or servers 104. According to an aspect, a routing policy can include rules for routing certain data along a route that does not require offloading to a long-haul carrier network 110 or that keeps traffic under the ISP's control for longer (i.e., on the ISP's networks 108), allowing the ISP to utilize their network(s) to offer a higher quality of service to their customers. For example, this may ensure high data flow instead of offloading to a less-performant network or a less-performant route. In various implementations, the optimized route server 204 is configured to call on a third-party system 205 that determines optimized routes and communicates determined optimized routes to the optimized route server. In some implementations, the optimized route server 204 is configured to call on a third-party system that determines a plurality of optimized routes and communicates determined optimized routes to the optimized route server, wherein the optimized route server is further configured to identify a particular optimized route (e.g., based on business rules or other selection criteria) as the optimal route to direct Internet data traffic from the client 102 to the remote server 104. An identified optimal route 202 can be stored in a data store 210.

According to an aspect, the optimized route server 204 is further operative or configured to act on an identified optimal route 202 (i.e., direct data traffic onto the optimal route). According to one implementation and as illustrated in FIG. 2A, when an optimal route 202 is identified, the optimized route server 204 is operative or configured to determine a strategic location along the optimal route to place a virtual network function (VNF 206) for routing traffic along the optimal route to the server 104. According to an example, the location can be determined based on knowledge of the underlying network topology and may be selected as an optimal location along the optimal route 202 to force the targeted subset of data traffic to remain on the ISP network 108. As is known in the art, a VNF 206 is configured to run in a network function virtualization infrastructure (NFVI) environment including physical resources, virtual resources, and a virtualization layer. For example, physical resources, which can include a range of standard cloud computing infrastructure hardware, are abstracted into virtual resources that are ultimately utilized by VNFs).

According to an aspect, as part of placing (deploying) the VNF 206 at the determined strategic location, the optimized route server 204 is configured to send a VNF package to a VNF manager that is configured to deploy the VNF on a network resource in the network along the optimal route. The VNF package includes metadata and executables that enable deployment of the VNF 206. As can be appreciated, VNFs 206 increase an ISP's flexibility and can reduce implementation times to near real-time. This allows for the steering of network traffic in ways that previously would have required far more complex solutions.

According to an example, the optimized route server 204 is operative or configured to provision the VNF 206 as a proxy or a default gateway such that the client 102/router 106a is configured to forward certain TCP/IP traffic destined for the server 104 to the VNF 206. The default gateway VNF 206 can be set by a standard client/server protocol, such as DHCP. Depending on the network configuration, there may be different default gateways for different logical networks. In some implementations, the determination of which TCP/IP traffic to forward to the VNF 206 can be based on rules, such as one or a combination of: the source IP/Port, protocol, and the destination IP/Port. For example, as data from a particular client 102 or client application (e.g., game application) that is intended for a particular server 104 embodied as a game server passes through an active network component that has been configured in a manner that indicates that the default gateway for network performant-sensitive data (e.g., data destined for a particular target IP address), that network component is configured to route the traffic to the interface associated with transmitting the IP address to the VNF 206. Accordingly, the traffic is sent to the VNF 206 on its path to its final destination (i.e., target server 104).

Figure 2B:
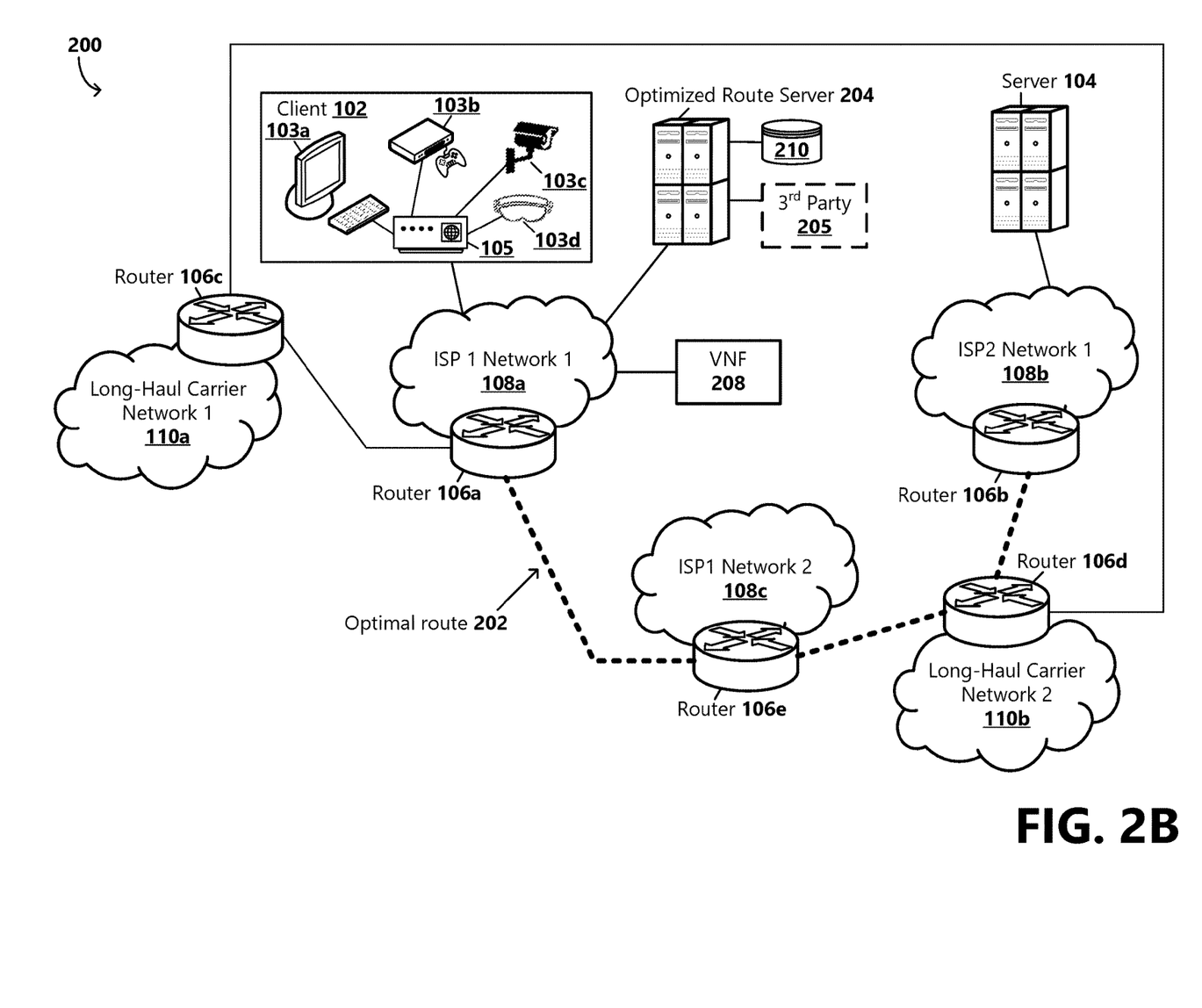
FIG. 2B is a block diagram of an example environment in which a system can be implemented for improving performance of network performant-sensitive online activities according to another embodiment.

According to another implementation, and as illustrated in FIG. 2B, the optimized route server 204 is operative or configured to deploy a VNF 208 as a virtual version of a router (virtual router) that is configured to advertise the optimal route 202 to its peers. For example, based on a client user's subscription (e.g., subscription to a service that provides optimized routing of network performant-sensitive data), the client 102 can be provisioned for traffic to travel through the virtual router, wherein a routing table for the virtual router is updated with the optimal route 202. In various examples, the virtualized router is deployed in the ISP network (e.g., 108a). The VNF 208 can be configured with five-tuple based rules (e.g., source IP/Port, protocol, destination IP/Port) that are discoverable using BGP and that result in steering traffic to the optimal route 202. Peer routers 106 that the VNF 208 advertises the optimal route 202 to (e.g., client intermediary device 105, other network routers 106) may update their BGP routing tables based on the optimal route information.

According to another implementation, the optimized route server 204 is operative or configured to emulate a router 106 and advertise the optimal route 202 to peer routers. For example, by emulating a router, the optimized route server 204 can emulate a network router and send commands to neighboring routers 106 that the neighboring routers would use to update their routing tables or receive as commands coming from another router 106. According to an aspect, as part of emulating a router, the optimized route server 204 can be configured to execute a software function that replicates in software the functionality of a hardware-based Layer 3 Internet Protocol (IP) routing device. In one example, the optimized route server 204 can advertise a particular optimal route 202 to peer routers for directing a particular subset of data along the optimal route for enabling network connections that are less subject to increased latency, drop outs, jitter, or other aspects that may lead to negative online performance.

Figure 3:
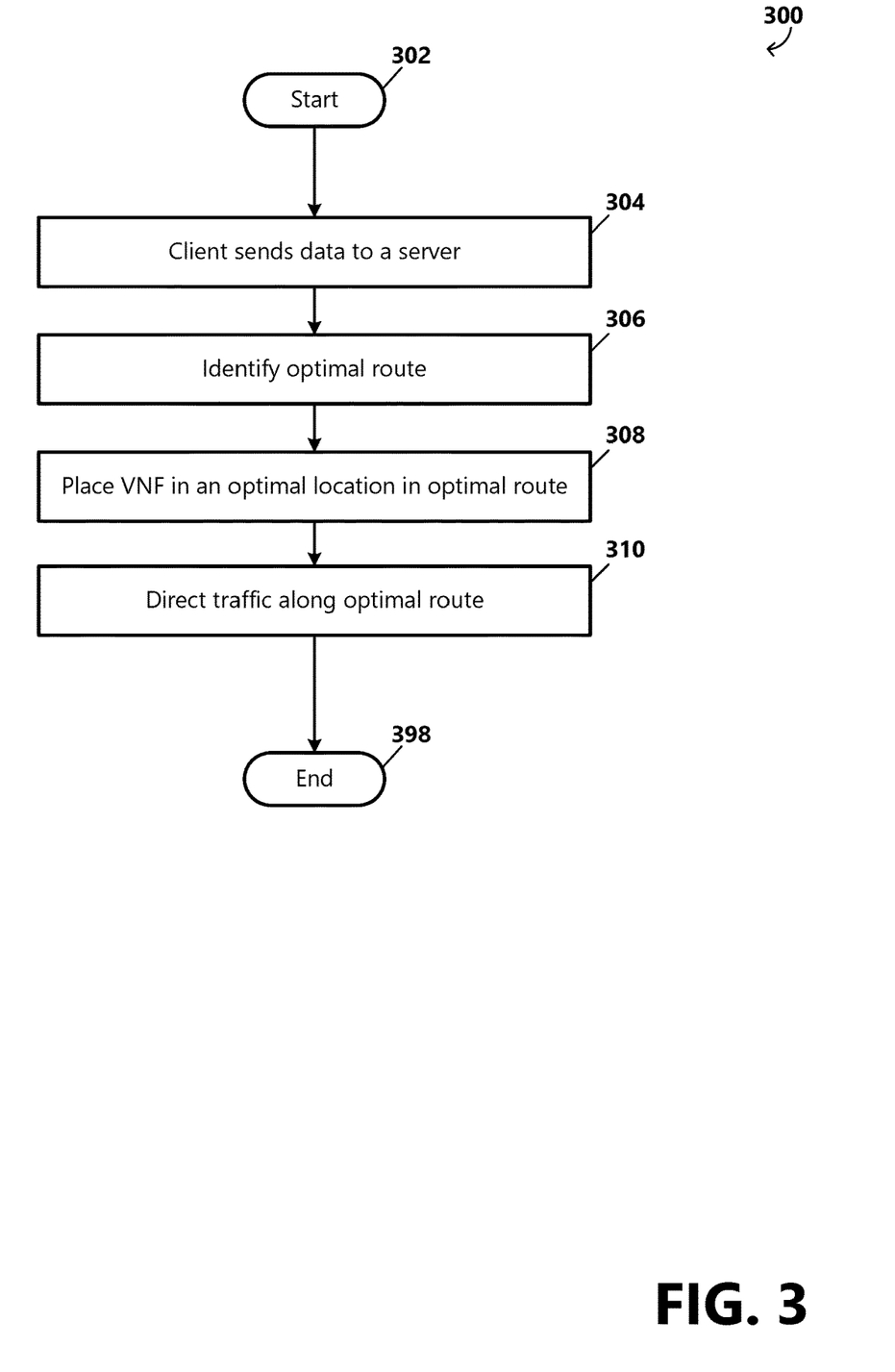
FIG. 3 is a flow diagram of depicting general stages of an example process for improving performance of network performant-sensitive online activities according to an embodiment.

FIG. 3 is a flow diagram that depicts general stages of an example method 300 for improving network performance of network performant-sensitive applications according to an embodiment. The method 300 begins at START OPERATION 302, and proceeds to OPERATION 304 where the method uses the client 102 to send data in association with an application/online activity to a server 104.

For identifying an optimal route 306 for delivery of the application data, the method 300 proceeds to OPERATION 306 where the method uses the optimized route server 204 to evaluate relative network performance of various routes to the server 104 and identify an optimal route 202. In some examples, the optimized route server 204 uses a third-party route determining system 205 to evaluate collected network performance data for determining an optimal route 202. For example, the network performance data can be collected by a file or computer system that is part of the route determining system 205 and communicated to the optimized route server 204 via an API (application programming interface) that is exposed to the optimized route server. In some example aspects, this data collection can be part of BFP neighbor data gathered by network components or data that is part of the communications between different components of the example operating environment 200.

At OPERATION 308, the method 300 uses the optimized route server 204 to place a VNF 206 at a strategic location along the optimal route 202, wherein the VNF is configured as a proxy or a default gateway such that the client 102 or router 106a is configured to forward the application data to the VNF 206 for steering the application data onto the identified optimal route 202. According to examples, the default gateway can be set by a standard client/server protocol, such as DHCP.

At OPERATION 310, the application data is forwarded to the VNF 206, which then forwards the application data to a next hop along the optimal route 202 or to the target/destination server 104, thus optimizing the network path for the application data which is less subject to increased latency, drop outs, jitter, or other aspects that may lead to a negative online experience. The method 300 ends at OPERATION 398.

Figure 4:
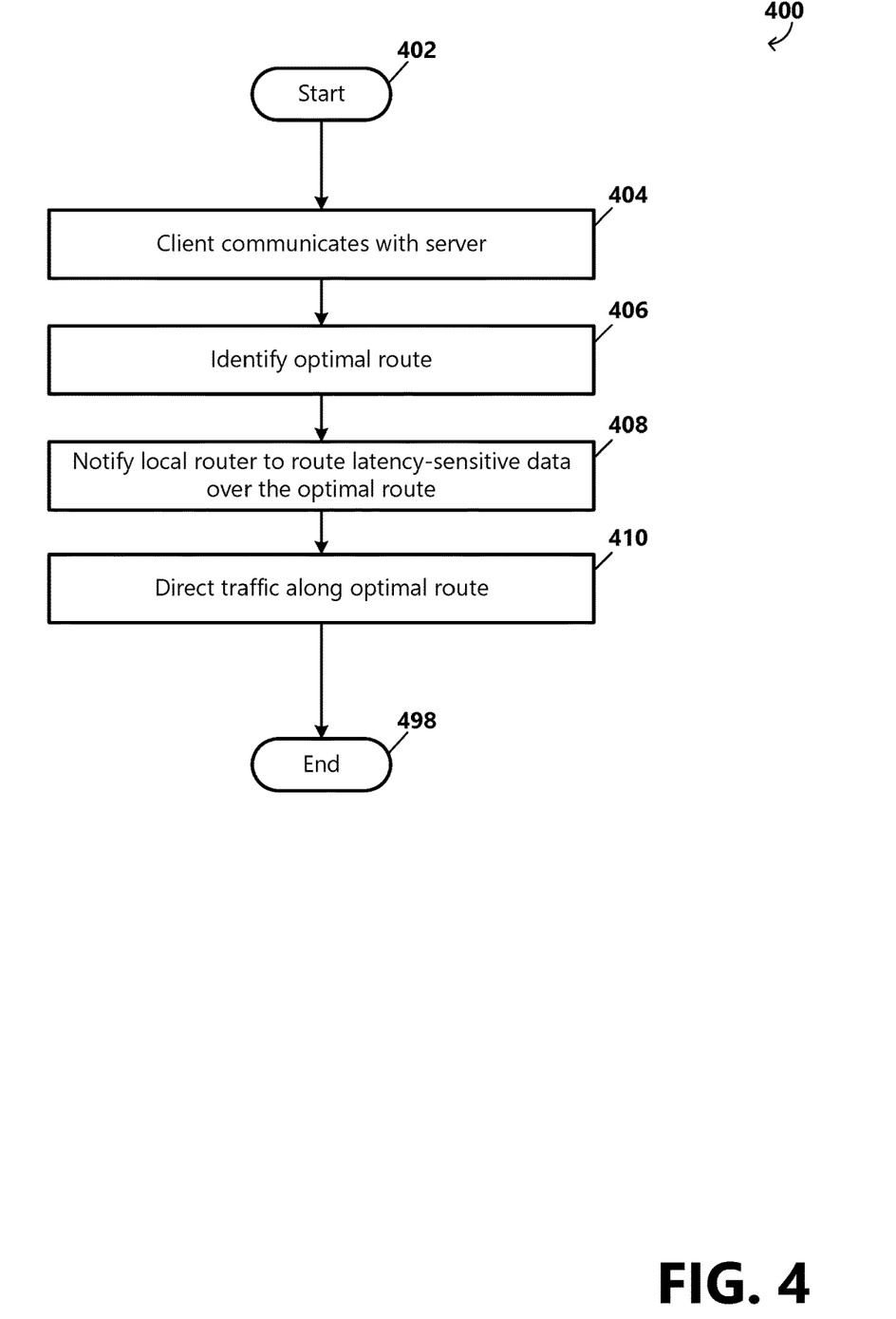
FIG. 4 is a flow diagram depicting general stages of an example process for improving performance of network performant-sensitive online activities according to another embodiment.

FIG. 4 is a flow diagram that depicts general stages of an example method 400 for improving network performance of network performant-sensitive applications/online activities according to another embodiment. The method 400 begins at START OPERATION 402, and proceeds to OPERATION 404 where the method uses the client 102 to send data in association with an application to a server 104.

For identifying a most efficient route 406 for delivery of the application data, the method 400 proceeds to OPERATION 406 where the method uses the optimized route server 204 to evaluate relative network performance of various routes to the server 104 and identifies an optimal route 202.

According to one embodiment, at OPERATION 408, the method 400 uses the optimized route server 204 to deploy a VNF 208 as a virtual version of a router in the ISP network 108, wherein the VNF is configured to advertise the optimal route 202 to its peers (e.g. client router 105). According to another embodiment, at OPERATION 408, the method 400 uses the optimized route server 204 to emulate a router and advertise the optimal route 202 to its peers (e.g., client router 105, access router 106a). For example, the method 400 uses the optimized route server 204 or the deployed VNF 208 configured as a virtual version of a router to tell the local router 106a to route the online activity data over the optimal route 202 based on five-tuple based rules (source IP/Port, protocol, destination IP/Port) discoverable using BGP.

At OPERATION 410, the method 400 uses a router 106 receiving the optimal route 202 to forward the online activity data to a next hop on the optimal route 202 for delivery to the destination server 104, thus optimizing the network path for the online activity data which is less subject to increased latency, drop outs, jitter, or other aspects that may lead to a negative online experience. The method 400 ends at OPERATION 498.

Figure 5:
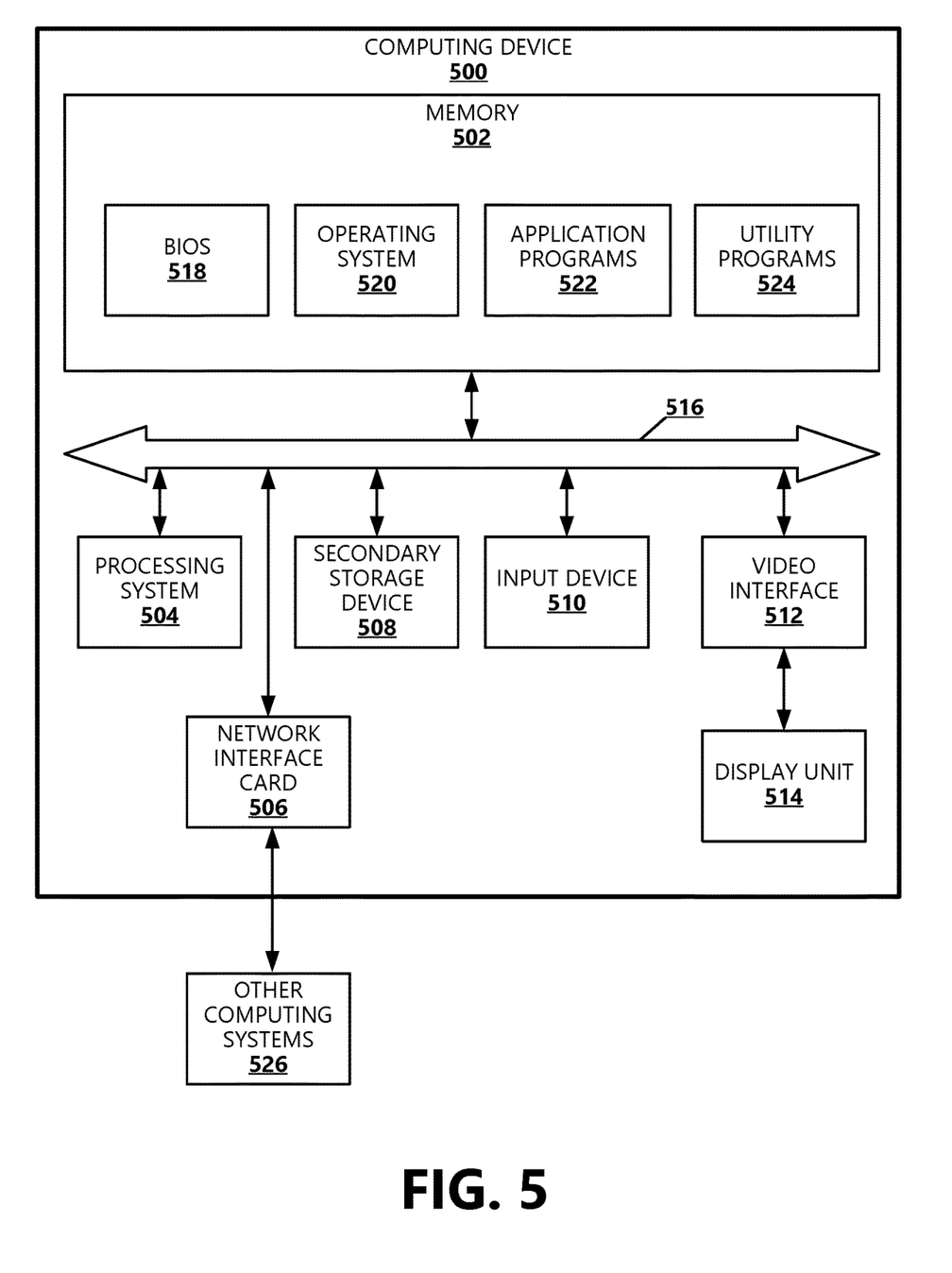
FIG. 5 is a block diagram illustrating example physical components of a computing device or system with which embodiments may be practiced.

FIG. 5 is a block diagram illustrating example physical components of a computing device or system 500 with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), radio/antenna 507, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, provide improved network performance of network performant-sensitive online activities. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figures 6A, 6B:
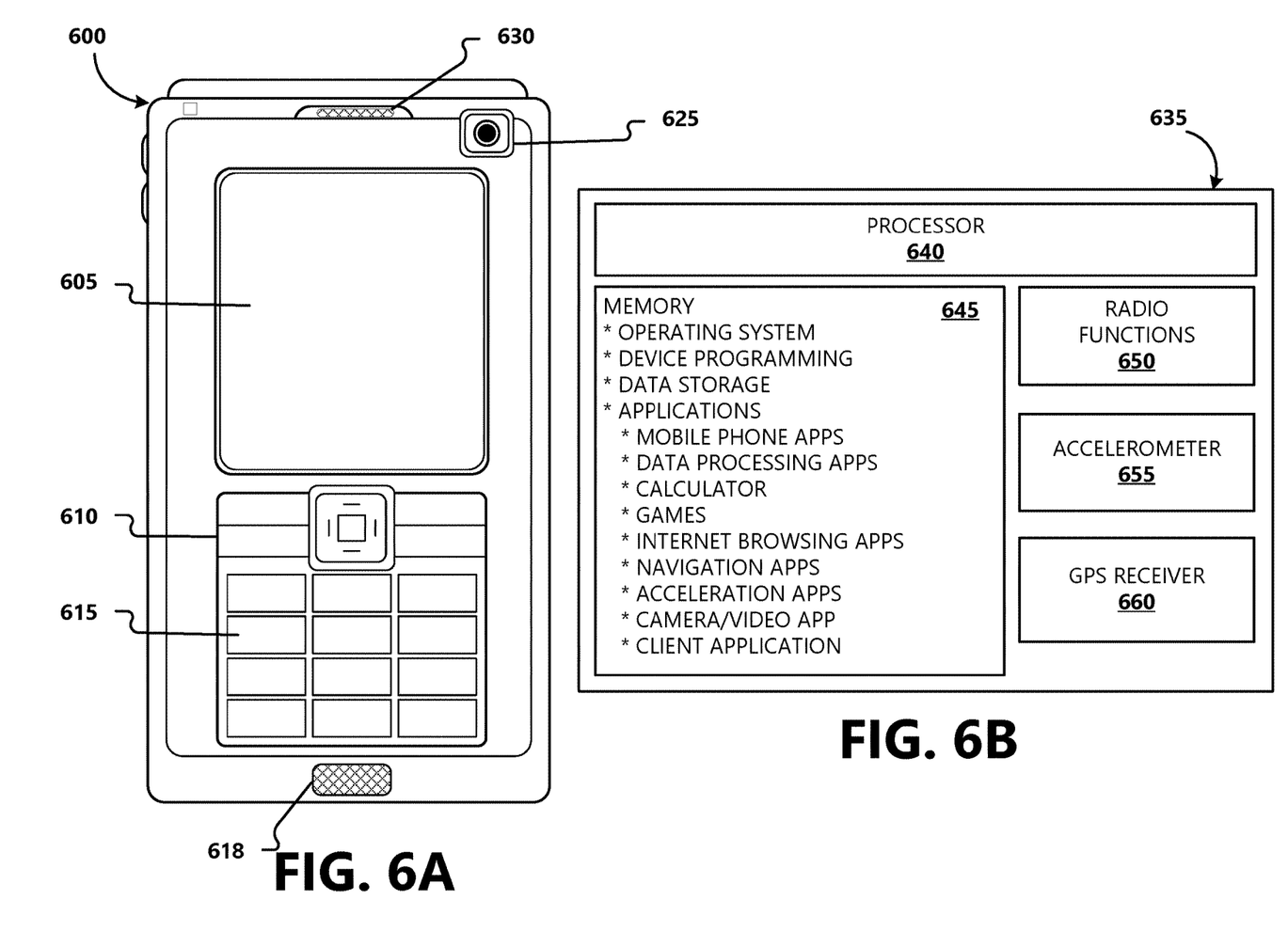
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other user device 102, with which aspects can be practiced. The mobile computing device 600 is illustrative of any suitable device operative to send, receive and process wireless communications. A display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

Figure 7:
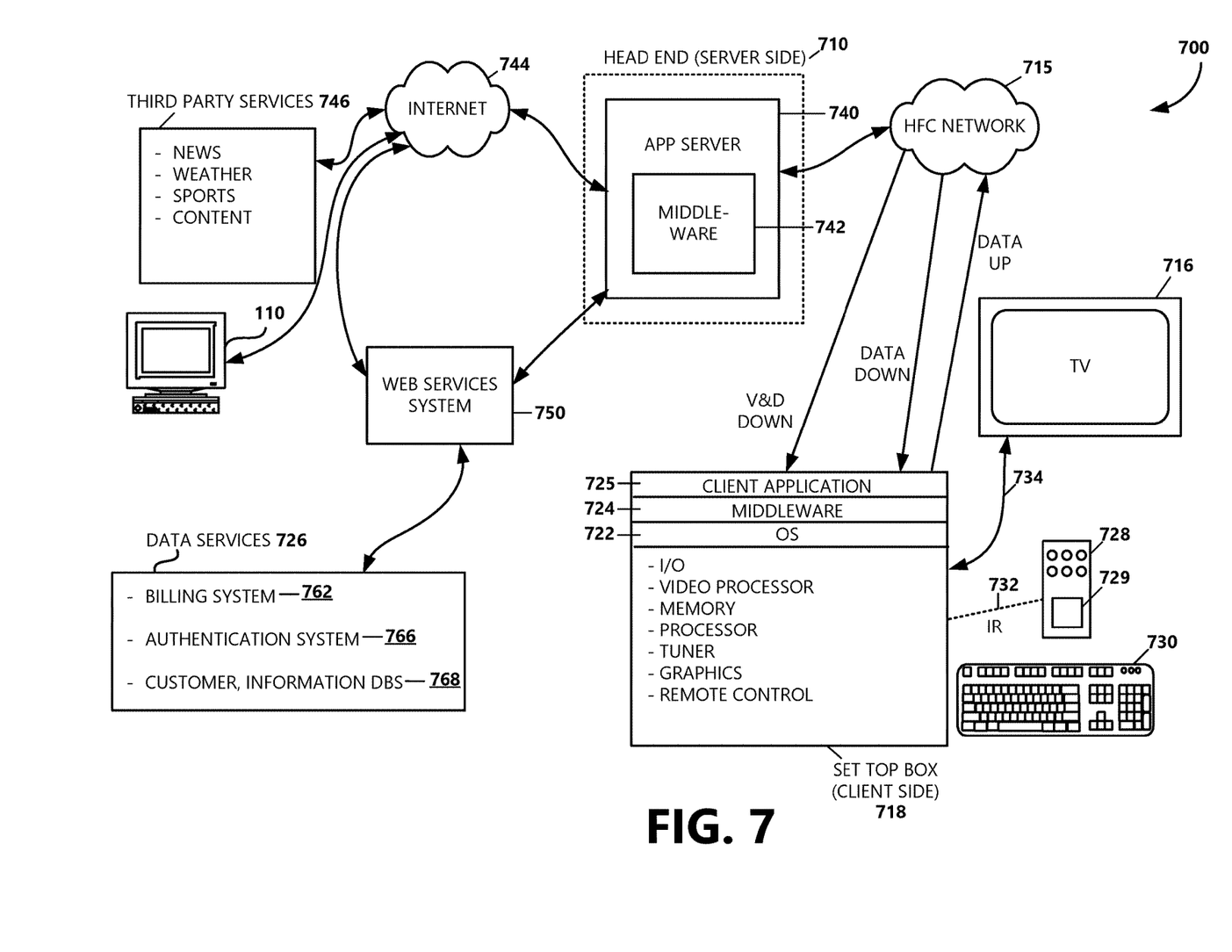
FIG. 7 is a block diagram illustrating components of a cable services system architecture providing an example operating environment according to aspects of the present disclosure.

FIG. 7 is a block diagram illustrating a cable television services system 700 (hereafter referred to as "CATV") architecture providing an operating environment according to an aspect. Referring now to FIG. 7, digital and analog video programming, information content, and interactive television services are provided via a hybrid fiber coax (HFC) network 715 to a television set 716 for consumption by a cable television/services system customer. As is known to those skilled in the art, HFC networks 715 combine both optical fiber and coaxial cable lines. Typically, optical fiber runs from the cable head end 710 to neighborhoods of subscribers. Coaxial cable runs from the optical fiber feeders to each customer or subscriber. The functionality of the HFC network 715 allows for efficient bidirectional data flow between the set-top box 718 and the application server 740 of the aspect.

The CATV system 700 is in the form of a distributed client-server computing system for providing video and data flow across the HFC network 715 between server-side services providers (e.g., cable television/services providers) via a server-side head end 710 and a client-side customer via a set-top box (STB) 718 functionally connected to a customer receiving device, such as the television set 716. As is understood by those skilled in the art, modern CATV systems 700 can provide a variety of services across the HFC network 715 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 715 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end system 710, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 715 through a video/data downlink and data via a data downlink. The STB 718 can transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 715 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 715 to the STB 718. Operation of data transport between components of the CATV system 700, described with reference to FIG. 7, is well known to those skilled in the art.

Referring still to FIG. 7, the head end 710 of the CATV system 700 is positioned on the server side of the CATV system and includes hardware and software systems responsible for originating and managing content for distributing through the HFC network 715 to client-side STBs 718 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 715. As described above, the application server 740 includes a middleware layer 742 for processing and preparing data from the head end 710 of the CATV system 700 for receipt and use by the client-side STB 718. For example, the application server 740 via the middleware layer 742 can obtain supplemental content from third-party services 746 via the Internet 744 for transmitting to a customer through the HFC network 715, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 715 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 715 and the STB 718.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt.

A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer.

The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. An authentication system 766 can include information such as secure user names, subscriber profiles, subscriber IDs, and passwords utilized by customers for access to network services. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for optimizing network performant-sensitive Internet data traffic between a first host on a client network and a second host on a remote network for improved performance of a network performant-sensitive application, the system comprising an optimized route server, comprising:
at least one processor; and
a memory storage device including instructions that when executed by the at least one processor are configured to:
receive data from the first host to be directed to the second host on the remote network;
identify an optimal route for directing the data from the first host on the client network to the second host on the remote network;
determine a strategic location along the optimal route for provisioning a default gateway through which to direct the data from the client network to the second host;
deploy a virtual network function (VNF) configured as the default gateway at the determined strategic location;
assign an address of the VNF as the default gateway to direct the data from the client network through the VNF and to the second host, wherein by directing the data through the VNF, the data is directed along the optimal route; and
dynamically modify the optimal route based on data traffic conditions on the identified optimal route.

2. The system of claim 1, wherein:
the data includes network performant-sensitive application data;
the second host is a game server configured to host an online game, wherein the online game is a network performant-sensitive application; and
the first host is configured to establish a connection with the second host as part of interacting with the online game.

3. The system of claim 1, wherein in determining the strategic location, the optimized route server is configured to determine a network resource in a network along the optimal route that forces the data transmitted from the client network onto the optimal route on a next hop.

4. The system of claim 3, wherein in deploying the VNF, the optimized route server is configured to communicate a VNF package to a VNF manager configured to deploy the VNF on the network resource in the network along the optimal route, wherein the VNF package includes metadata and executables to enable deployment of the VNF.

5. The system of claim 1, wherein in identifying the optimal route, the optimized route server is configured to receive the optimal route from a third-party system configured to determine the optimal route.

6. The system of claim 5, wherein the optimal route is determined as an optimal route due to at least one of:
low latency;
low packet loss;
low number of hops; and
an inclusion of networks provided by a particular Internet service provider.

7. The system of claim 1, wherein the optimized route server is further configured to:
identify an updated optimal route for transfer of data from the first host to the second host;
determine an updated strategic location along the updated optimal route for provisioning the default gateway through which to direct the data from the client network to the second host;
deploy a second VNF at the updated strategic location; and
assign an address of the VNF as the default gateway to direct the data from the client network through the VNF and to the second host, wherein by directing the data to the second VNF, the data is directed along the updated optimal route.

8. A system for optimizing network performant-sensitive Internet data traffic between a first host on a client network and a second host on a remote network for improved performance of a network performant-sensitive application, the system comprising an optimized route server, comprising:
at least one processor; and
a memory storage device including instructions that when executed by the at least one processor, are configured to:
receive data from the first host to be directed to the second host on the remote network;
configure a router in a service provider network to which the client network is communicatively attached, wherein in configuring the router, the optimized route server is configured to:
identify an optimal route for directing the data from the first host on the client network to the second host on the remote network;
determine a strategic location along the optimal route for provisioning a default gateway through which to direct the data from the client network to the second host;
deploy a virtual network function (VNF), at the determined strategic location configured as a virtual router in the service provider network that is communicatively attached to a router in the client network;
configure the virtual router or the emulated router to advertise the optimal route to border gateway protocol (BGP) peers to direct the data from the client network addressed to the second host along the optimal route; and
dynamically modify the optimal route based on data traffic conditions on the identified optimal route.

9. The system of claim 8, wherein in configuring the virtual router or the emulated router to advertise the optimal route to BGP peers, the system is configured to advertise the optimal route to the router in the client network.

10. The system of claim 8, wherein in configuring the virtual router or the emulated router to advertise the optimal route to BGP peers, the system is configured to advertise the optimal route as a default route.

11. The system of claim 8, wherein:
the data includes network performant-sensitive application data;
the second host is a game server configured to host an online game, wherein the online game is a network performant-sensitive application; and
the first host is configured to establish a connection with the second host as part of interacting with the online game.

12. The system of claim 8, wherein in identifying the optimal route, the optimized route server is configured to receive the optimal route from a third-party system configured to determine the optimal route.

13. The system of claim 12, wherein the optimal route is determined as an optimal route due to at least one of:
low latency;
low packet loss;
low number of hops; and
an inclusion of networks provided by the service provider.

14. The system of claim 8, wherein the optimized route server is further configured to:
identify an updated optimal route for directing data from the first host on the client network to the second host on the remote network; and
configure the virtual router or the emulated router to advertise the updated optimal route to border gateway protocol (BGP) peers to direct the data from the client network addressed to the second host along the optimal route.

15. A method for optimizing network performant-sensitive Internet data traffic between a first host on a client network and a second host on a remote network for improved performance of a network performant-sensitive application, the method comprising:
receive data from the first host to be directed to the second host on the remote network;
identifying an optimal route for directing the data from the first host on the client network to the second host on the remote network;
determining a strategic location along the optimal route for provisioning a default gateway through which to direct the data from the client network to the second host;
deploying a virtual network function (VNF) configured as the default gateway at the determined strategic location;
assigning an address of the VNF as the default gateway to direct the data from the client network through the VNF and to the second host, wherein by directing the data through the VNF, the data is directed along the optimal route;
configuring a router in a service provider network to which the client network is communicatively attached, wherein configuring the router comprises one of:
deploying a VNF configured as a virtual router in the service provider network that is communicatively attached to a router in the client network; and
configuring the virtual router or the emulated router to advertise the optimal route to border gateway protocol (BGP) peers to direct the data from the client network addressed to the second host along the optimal route; and
dynamically modify the optimal route based on data traffic conditions on the identified optimal route.

16. The method of claim 15, wherein configuring the virtual router or the emulated router to advertise the optimal route to BGP peers comprises configuring the virtual router or the emulated to advertise the optimal route to the router in the client network.

17. The method of claim 15, wherein determining the strategic location comprises determining a network resource in a network along the optimal route that forces the data transmitted from the client network onto the optimal route on a next hop.

18. The method of claim 15, wherein deploying the VNF configured as the default gateway comprises communicating a VNF package to a VNF manager configured to deploy the VNF on the network resource in the network along the optimal route, wherein the VNF package includes metadata and executables to enable deployment of the VNF.

19. The method of claim 18, wherein receiving the optimal route comprises receiving a route that is determined as the optimal route due to at least one of:
low latency;
low packet loss;
low number of hops; and
an inclusion of networks provided by a particular Internet service provider.

20. The method of claim 15, wherein identifying the optimal route comprises receiving the optimal route from a third-party system configured to determine the optimal route.

* * * * *